United States Patent [19]

Peters et al.

[11] Patent Number: 4,837,783

[45] Date of Patent: Jun. 6, 1989

[54] DEVICE FOR DERIVING A SYNCHRONIZING SIGNAL

[75] Inventors: Joseph H. Peters; Johannes T. Kanters, both of Eindhoven, Netherlands

[73] Assignee: U.S. Philips Corp., New York, N.Y.

[21] Appl. No.: 904,088

[22] Filed: Sep. 4, 1986

[30] Foreign Application Priority Data

Sep. 23, 1985 [NL] Netherlands ............... 8502600

[51] Int. Cl.$^4$ ............................................. H04L 7/00
[52] U.S. Cl. ...................................... 375/110; 307/516
[58] Field of Search ............... 370/100, 108; 375/110, 375/113; 328/63, 72, 109, 110; 307/516

[56] References Cited

U.S. PATENT DOCUMENTS

| | | | |
|---|---|---|---|
| 3,581,010 | 5/1971 | Kobayashi | 375/110 |
| 4,308,550 | 12/1981 | Melwisch et al. | 358/18 |
| 4,354,229 | 10/1982 | Davis et al. | 364/200 |
| 4,356,566 | 10/1982 | Wada et al. | 375/116 |
| 4,398,291 | 8/1983 | Hotta et al. | 370/104 |
| 4,675,722 | 6/1987 | Hackett | 358/13 |

Primary Examiner—Douglas W. Olms
Attorney, Agent, or Firm—Bernard Franzblau

[57] ABSTRACT

A device for deriving a synchronizing signal comprises a synchronizing signal detector (1) having an output (3) is coupled both directly and via a delay unit (18) to inputs (4 and 19, respectively) of a signal combination unit (5). The output (6) thereof is coupled to an input (7) of a flywheel counter (8). One output (9) of the flywheel counter supplies the synchronizing signal. Another output is coupled to an input (11) of the signal combination unit. The first input (4) and the second input (11) of the combination unit are coupled to inputs of a time slot circuit (12). The first input (4) and the third input (19) of the combination unit are coupled to inputs (20, 21) of a further combination unit (14). The output of the time slot circuit is also coupled to an input (13) of the further combination unit (14). The delay time (T) of the delay unit (18) is equal to n times the period of the synchronizing signal. Therefore, the device is less sensitive to "false lock" and can recapture the synchronization rapidly after a loss of synchronization.

8 Claims, 3 Drawing Sheets

DEVICE FOR DERIVING A SYNCHRONIZING SIGNAL

BACKGROUND OF THE INVENTION

This invention relates to a device for deriving a synchronizing signal from an electric signal alternately comprising blocks of information and the synchronizing signal, including a synchronizing signal detector having an input for receiving the electric signal and an output for supplying a detection signal, a flywheel counter having an input coupled to the output of the synchronizing signal detector, a first output for supplying the synchronizing signal and a second output for supplying a control signal, and a signal combination unit having a first and a second input coupled to the output of the synchronizing signal detector and to the second output of the flywheel counter, respectively, and an output coupled to the input of the flywheel counter for restarting the flywheel counter under the influence of the signals presented to its inputs.

A device of this type is known from U.S. Pat. No. 3,581,010. The known device has for its object to synchronize the flywheel counter by means of the detection signal which is not directly used as a synchroniing signal, which counter supplies electric signal pulses with a period corresponding to the period of the synchronizing signal. These pulses are used as a synchronizing signal. A missing synchronizing pulse in the electric input signal no longer has any influence because the flywheel counter continues to operate and supplies pulses at a frequency corresponding to the internal frequency of the flywheel counter. The second output of the flywheel counter supplies a control signal which is applied to the signal combination unit serving as a time slot circuit. Only around the instant when the detection signal from the synchronizing signal detector is expected does the second output of the flywheel counter supply a control signal such that the signal combination unit passes the detection signal and the flywheel counter can be started again. Thus, if the synchronizing signal detector were to supply a detection signal falling outside the aforementioned time slot (for example, because the blocks of information accidentally comprise information which is equal to the synchronizing signal - false lock -), that is to say, if a false detection has taken place, the flywheel counter is prevented from being started again.

However, the device has the drawback that it does not always function satisfactorily and that the synchronization is completely lost, for example, because all pulses in the detection signal supplied by the synchronizing signal detector fall outside the time slot. It is an object of the invention to obviate this drawback and to provide a device which can capture the synchronization (very) rapidly and supplies a synchronizing signal in the rhythm of the synchronizing signal in the electric signal.

SUMMARY OF THE INVENTION

To this end the device according to the invention is characterized in that the signal combination unit has a third input, in that the output of the synchronizing signal detector is coupled to said third input via a delay unit and in that the delay time of the delay unit at least substantially corresponds to n times the temporal length of the information block and the synchronizing signal, where n is an integer which is larger than or equal to 1. Preferably n=1 is chosen. The measure according to the invention is based on the recognition that the conventional method of solving the afore-mentioned problem, namely the elimination of the time slot until the next sync pulse has been received in the detection signal, is too slow and the system is thus not synchronized for too long a time. In fact, a number of periods is required to determine whether the system has lost its synchronization beyond any doubt. Moreover, if the next sync pulse appears to be false, the procedure should be repeated.

It can be concluded that a time shift may block the reconstruction of the information signal over a long period. By adding the delay unit it is achieved that the system can be synchronized again in principle within two periods (namely for n=1) after it has lost its synchronization, because two detection signals from the synchronizing signal detector can restart the flywheel counter independent of the time slot if these detection signals are spaced apart over exactly n periods.

It is necessary that the detection signals applied to the first and third input of the signal combination unit are temporarily spaced apart such that the signal combination unit supplies a pulse from its output, if real synchronization pulses are concerned. This means that the delay time of the delay unit must be longer than $n \cdot p - b$ and shorter than $n \cdot p + b$, where p is the period of the synchronizing signal and b is the width of the pulses supplied by the synchronizing signal detector. The width of the pulses supplied by the signal combination unit should of course be such that the flywheel counter can be restarted therewith.

The signal combination unit may be realized in various manner. For example, the signal combination unit may comprise an AND-gate and an OR-gate, the second and the third input of the signal combination unit being coupled to a first and a second input, respectively, of the OR-gate and the first input of the signal combination unit and an output of the OR-gate being coupled to a first and a second input, respectively, of the AND-gate an output of which is coupled to the output of the signal combination unit. Another possibility is that the signal combination unit comprises a time slot circuit and a further signal combination unit, a first and a second input of the time slot circuit being coupled to the first and the second input of the signal combination unit, an output of the time slot circuit being coupled to a first input of the further signal combination unit. A second and a third input of the further signal combination unit is coupled to the first and the third input, respectively, of the signal combination unit, and an output of the further signal combination unit is coupled to the output of the signal combination unit.

The output of the time slot circuit may also be coupled to an erase input of the delay unit for erasing information present in the delay unit under the influence of a signal which is present at the output of the time slot circuit. This may result in a considerable improvement of the detection mechanism because the risk of a "false lock" situation is considerably reduced.

BRIEF DESCRIPTION OF THE DRAWING

The invention will be described in greater detail with reference to a description of the accompanying drawing in which.

DESCRIPTION OF THE PREFERRED EMBODIMENTS

Figure 1:
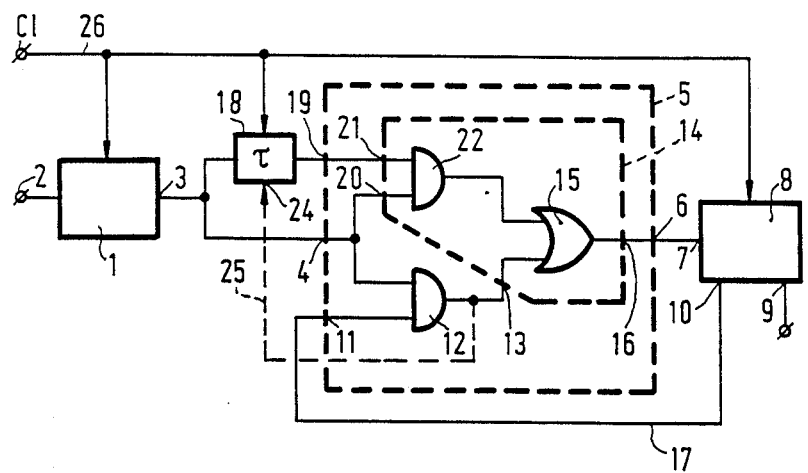
FIG. 1 shows a first embodiment.

Elements in the different Figures having the same reference numerals have the same function.

FIG. 1 shows an embodiment of a device comprising a synchronizing signal detector 1 having an input 2 for receivig the electric signal which alternately comprises blocks of information and the synchronizing signal, and an output 3 for supplying a detection signal. Whenever the detector 1 detects the presence of the synchronizing signal in the electric signal, it supplies, for example, a pulse from its output 3. Detectors of this type are known per se, for example, from U.S. Pat. No. 4,356,566. The output 3 of the detector 1 is coupled to a first input 4 of a signal combination unit 5. The output 6 of the signal combination unit 5 is coupled to an input 7 of a flywheel counter 8. The flywheel counter 8 has a first output 9 and a second output 10. A pulse applied to the input 7 causes the flywheel counter to (re)start which subsequently supplies pulses from its output 9 with a period corresponding to the period of the synchronizing signal. The second output 10 supplies a control signal 17 which is applied to a second input 11 of the combination unit 5. The first and second inputs 4 and 11 of the combination unit 5 are coupled via a time slot circuit 12 in the form of an AND-gate to a first input 13 of a further signal combination unit 14. The first input 13 of the signal combination unit 14 is coupled via an OR-gate 15 to the output 16 which constitutes the output 6 of the combination unit 5. The time slot circuit 12 is intended to pass only those pulses in the output signal of the detector 1 which fall within a time slot which is determined by the pulse width of the pulses in the control signal 17. The flywheel counter 8 is to be restarted only by these pulses in the output signal of the detector 1. The time slot which is thus determined by the width of the pulses in the control signal 17 has a width which is preferably larger than the width of a pulse in the output signal of the detector 1 so that an instantaneous resynchronization can be effected if the synchronizing signal in the data applied to the input 2 is shifted in time, for example, due to burst errors combined with time base errors.

Furthermore the output 3 of the detector 1 is coupled via a delay unit 18 to a third input 19 of the combination unit 5. The delay time of the delay unit 18 is equal to n times the period, which period corresponds to the temporal length of the information block and the synchronizing signal. n may be larger than or equal to 1. The first input 4 and the third input 19 of the combination unit 5 are coupled via a second input 20 and a third input 21 respectively, of the further combination unit 14 to associated inputs of an AND-gate 22. The output of the AND-gate 22 is coupled to an input of the OR-gate 15.

Pulses appear at the output of the AND-gate 22 only when subsequent pulses of the detector 1 are correctly spaced in time relative to one another (namely n times the period of the synchronizing signal). It is achieved thereby that independent of the signal appearing at the output of the AND-gate 12 the flywheel counter 8 can be restarted by a pulse supplied by the AND-gate 22. This means that if the synchronization is completely lost (that is to say, when all pulses of the detector 3 fall outside the time slot (12), resynchronization is effected within n+1 periods of the synchronizing signal after the loss of synchronization. Thus already within two periods for n=1. Besides, the risk of a "false lock" is considerably reduced s compared with the situation in which the flywheel counter was to be directly restarted by the output signal of the synchronizing signal detector 1.

Figure 5:
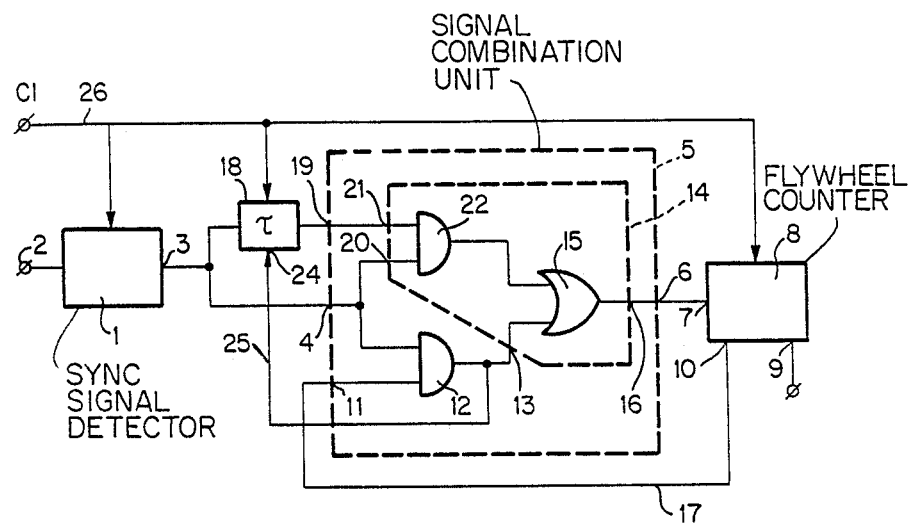
FIG. 5 shows a modified form of the embodiment of FIG. 1.

A further reduction of the risk of a "false lock" can be achieved, as shown in FIG. 5, if the delay unit 18 is formed in such a manner that it has an erase input 24 for erasing information present in the delay unit (for example, a shift register) under the influence of an erase signal 25 which is obtained from the output of the time slot circuit 12, see the line denoted by the reference numeral 25. This means that no pulse occurs at the output of AND-gate 22 as long as the pulses at the output 3 of the detector 1 fall within the slot determined by the control signal 17.

Both the detector 1 and the flywheel counter 8, and if formed as a digital shift register also the delay unit 18, should receive a clock signal c1 via the lead 26 for a satisfactory operation of the entire system. This clock signal c1 determines the rate at which the serial data flow is presented to the input 2.

Figure 2:
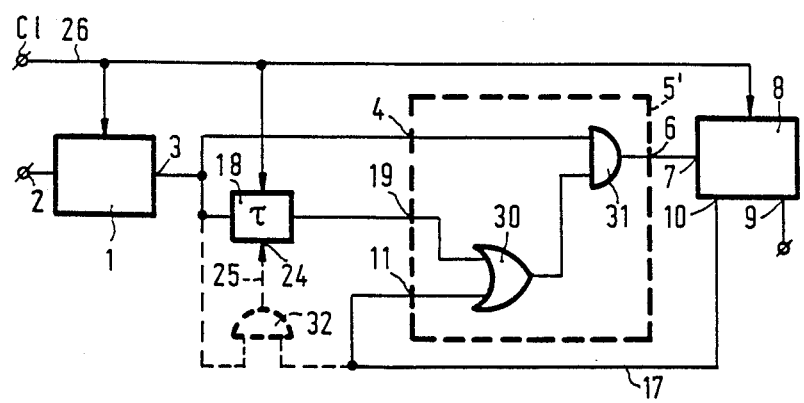
FIG. 2 shows a second embodiment.

FIG. 2 shows a further embodiment similar to that of FIG. 1. Only the signal combination unit 5 is formed in a different manner and is denoted by the reference numeral 5'. The combination unit 5' comprises an OR-gate 30 and an AND-gate 31.

The second input 11 and the third input 19 of the combination unit 5' are coupled to associated inputs of the OR-gate 30. The output of the OR-gate 30 and the first input 4 of the combination unit 5' are coupled to associated inputs of the AND-gate 31. The output of the AND-gate 31 constitutes the output 6 of the combination unit 5'.

The operation of the signal combination unit 5' is identical to the operaton of the combination unit 5 of FIG. 1. Therefore, the operation of the circuit of FIG. 2 is identical to that of FIG. 1. It stands to reason that the combination unit may also be formed in different ways. For example, the gate 30 could be replaced by an AND-gate whose inputs and outputs are inverted.

If the delay unit 18 were to be formed as an erasable delay unit, which means that an erase signal (as is present on the lead 25 of FIG. 5) is required, this erase signal cannot be directly derived from a poit somewhere in the circuit of the signal combination unit 5'. For that purpose an extra AND-gate (not shown) is required whose inputs are coupled to the output 3 of the detector 1 and the output 10 of the flywheel counter 8 and whose output is coupled to the erase input 24 of the delay unit 18.

Figure 3:
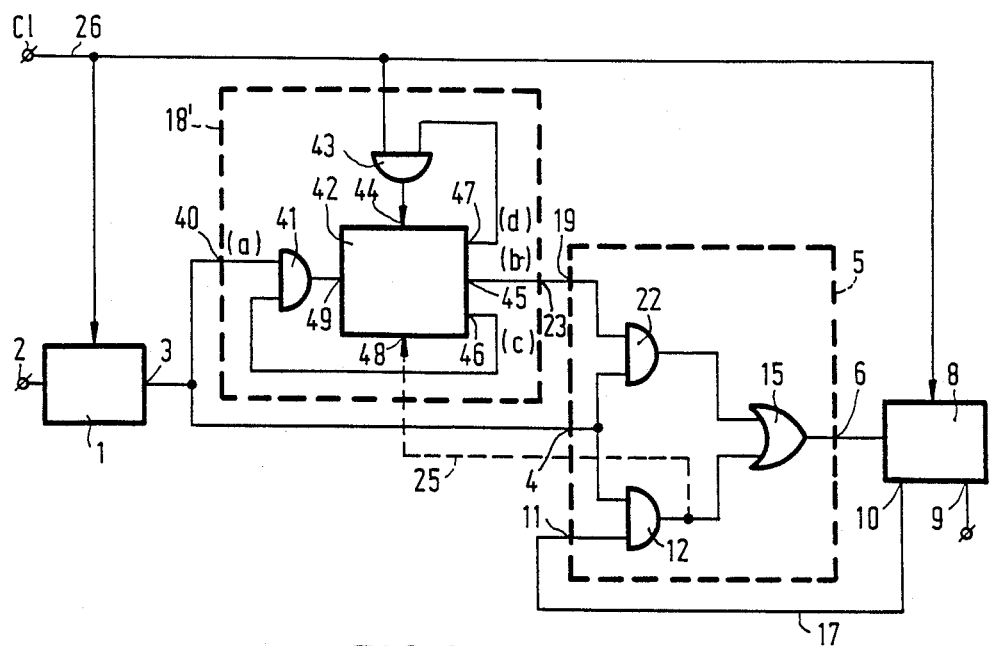
FIG. 3 shows a third embodiment of the device.

FIG. 3 shows a further embodiment. this embodiment has a great resemblance to that of FIG. 1, except that the delay unit 18 has a different construction and is therefore denoted by the reference numeral 18'.

The input 40 of the delay unit 18' is coupled via an AND-gate 41 to a "set" input 49 of a down counter 42. The clock signal c1 at the lead 26 is applied via an AND-gate 43 to a clock input 44 of the down counter 42. The down counter 42 has three outputs. One output 45 constitutes the output 23 of the delay unit 18'.

The output 46 is coupled to an input of the AND-gate 41 and an output 47 is coupled to an input of the AND-gate 43.

A lead similar to lead 25 of FIG. 5 may be is coupled from the output of gate 12 to a reset input 48 of the down counter 42.

The operation of the delay unit 18' will be further explained with reference to the signals as a function of time shown in FIG. 4

Figure 4:
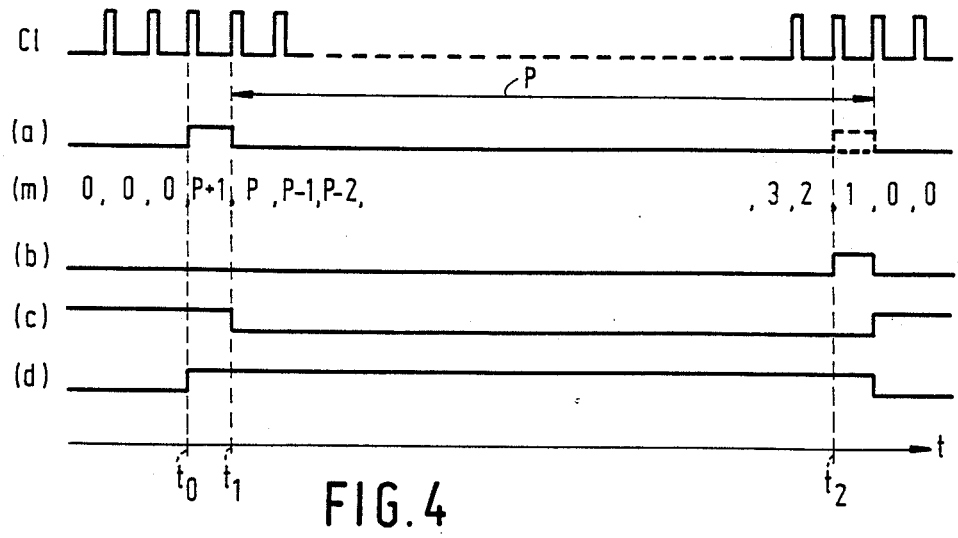
FIG. 4 shows a number of signals as a function of time in the element of the embodiment of FIG. 3 functioning as a delay unit.

The signal in FIG. 4 denoted by c1 represents the clock signal c1 which is presented to one input of the AND-gate 43.

At a given instant $t_o$ the detector 1 detects a synchronizing signal. This can be seen in the signal in FIG. 4 denoted by (a). This signal will become "high" for a short time and is presented to one input of the AND-gate 41. As the output 46 is "high" at that instant, see the signal (c) in FIG. 4, the pulse in the signal (a) is passed onto the "set" input 49 of the down counter 42. The internal counter in the down counter 42 thereby changes to the number $m = n \cdot p + 1$ where p is the period of the synchronizing signal in number of pulses of the clock signal c1 and n is equal to the previously mentioned number, i.e. equal to 1 in the case of FIG. 4, see the row of numbers in FIG. 4 denoted by (m). In addition to output 47 changes to a logic high value at the instant $t_o$, see the signal denoted by (d) in FIG. 4. The result is that the AND-gate 43 passes the clock pulses c1 which are thus applied to the clock input 44. Consequently the down counter 42 starts to count down so that the internal counter position returns from $m = n \cdot p + 1$ to $m = 1$ at the instant $t = t_2$. At that instant a pulse appears at the output 45, see the siganl (b) in FIG. 4. It is clear from the signals (a) and (b) that the pulse in the signal (a)—presented to the input 40 of the delay unit 18'—appears again at the output 23 delayed over n periode p (thus in FIG. 4 n=1!).

If the synchronizing signal were not false at the instant $t = t_o$, a pulse will generally appear in the signal (a) at the instant $t = t_2$. The signals at the outputs 46 and 47 are denoted by (c) and (d), respectively, in FIG. 4 and are self-evident.

During the time when the synchronisation is captured, the delay unit 18' is more sensitive to false synchronizing pulses than the delay unit 18 if this unit is formed as a shift register. In fact, it is obvious from FIG. 4 that after the occurrence of a pulse at the input 40 this input is subsequently blocked for pulses which are applied to the input 40 after $t_o$, but within a lapse of n periods after $t_o$. If the pulse were a false pulse at the instant $t = t_o$, it takes a longer time before the system is again synchronized than in the sytem comprising a delay unit in the form of a shift register in which correct sync pulses as well as false pulses are normally shifted in the shift register and appear at the output again. The advantage of the circuit of FIG. 3 is that the delay unit 18' can be realized in a simpler manner with fewer components than a delay unit 18 in the form of a shift register.

What is claimed is:

1. A device for deriving a synchronizing signal from an electric signal including alternate blocks of information and the synchronizing signal, comprising:
   a synchronizing signal detector having an input for receiving the electric signal and an output for supplying a detection signal,
   a flywheel counter having an input, a first output for supplying the synchronizing signal and a second output for supplying a control signal, and
   a signal combination unit having a first and a second input coupled to the output of the synchronizing signal detector and to the second output of the flywheel counter, respectively, and an output coupled to the input of the flywheel counter for restarting the flywheel counter under the influence of the signals presented to the inputs of the signal combination unit, characterized in that the signal combination unit has a third input coupled to the output of the synchronizing signal detector via a delay unit having a delay time which at least substantially corresponds to n times the temporal length of the information block and the synchronizing signal, where n is an integer which is larger than or equal to 1.

2. A device as claimed in claim 1, characterized in that n=1.

3. A device as claimed in claim 1, characterized in that the signal combination unit comprises an AND-gate and an OR-gate, in that the second and the third input of the signal combination unit are coupled to a frist and a second input, respectively, of the OR-gate, and in that the first input of the signal combination unit and an output of the OR-gate are coupled to a first and a second input, respectively, of the AND-gate, an output of the AND-gate being coupled to the output of the signal combintion unit.

4. A device as claimed in claim 1, characterized in that the signal combination unit comprises a time slot circuit and a further signal combination unit, in that a first and a second input of the time slot circuit are coupled to the first and the second input of the signal combination unit, an output of the time slot circuit being coupled to a first input of the further signal combination unit, a second and a third input of the further signal combination unit being coupled to the first and the third input, respectively, of the signal combination unit, and an output of the further signal combination unit being coupled to the output of the signal combination unit.

5. A device as claimed in claim 4, characterized in that the output of the time slot circuit is also coupled to an erase input of the delay unit for erasing information present in the delay unit under the control of a signal which is present at the output of the time slot circuit.

6. A device as claimed in claim 5, characterized in that the time slot circut includes an AND-gate, in that the further signal combination unit comprises a further AND-gate and an OR-gate, in that the first and third inputs of the signal combination unit are coupled to first and second inputs, respectively, of the further AND-gate, and in that outputs of the two AND-gates are coupled to associated inputs of the OR-gate an output of which constitutes the outpus of the siganl combination unit.

7. A device as claimed in claim 4, characterized in that the time slot circuit includes an AND-gate, in that the further signal combination unit comprises a further AND-gate and an OR-gate, in that the first and third inputs of the signal combination unit are coupled to first and second inputs, respectively, of the futher AND-gate, and in that outputs of the two AND-gates are coupled to associated inputs of the OR-gate, and wherein an output of the OR-gate is the output of the signal combination unit.

8. A device as claimed in claim 1, wherein the delay unit comprises:
   a down counter having a clock input, a set input, and first, second and third output, said first counter output being coupled to said third input of the signal combination unit,
   a first AND gate having a first input coupled to the output of the synchronizing signal detector, a second input coupled to the second output of the down counter and an output coupled to said set input of the down counter, and
   a second AND gate having a first input coupled to a source of clock pulses, a second input coupled to the thrid output of the down counter and an output coupled to said clock input of the down counter.

* * * * *